United States Patent [19]
Hackett, Jr. et al.

[11] Patent Number: 4,757,378
[45] Date of Patent: Jul. 12, 1988

[54] MONOCULAR SCENE GENERATOR FOR BIOCULAR WIDE FIELD OF VIEW DISPLAY SYSTEM

[75] Inventors: William E. Hackett, Jr., Wallingford; John E. Burkam, Media, both of Pa.

[73] Assignee: The Boeing Company, Seattle, Wash.

[21] Appl. No.: 913,449

[22] Filed: Sep. 30, 1986

[51] Int. Cl.⁴ .................. H04N 13/00; H04N 7/18
[52] U.S. Cl. ........................... 358/88; 358/93; 358/87
[58] Field of Search .............. 358/229, 93, 87–92, 358/109, 3; 350/130, 131

[56] References Cited

U.S. PATENT DOCUMENTS

| | | | |
|---|---|---|---|
| 3,614,314 | 10/1971 | Rossire | 358/88 |
| 4,028,725 | 6/1977 | Lewis | 358/109 |
| 4,259,948 | 4/1981 | Urban | 358/87 |
| 4,395,731 | 7/1983 | Schoolman | 358/93 |
| 4,429,328 | 1/1984 | Jones, Jr. et al. | 358/88 |

Primary Examiner—Howard W. Britton
Assistant Examiner—John K. Peng
Attorney, Agent, or Firm—Jones, Tullar & Cooper

[57] ABSTRACT

A visual display apparatus for producing a wide field of view picture to an operator includes television cameras directed parallel to a reference axis and disposed angularly left and right of the axis, monitors on which the pictures produced by the cameras are displayed, and lens for magnifying and focusing the monitor pictures. The angularly disposed cameras and their corresponding monitors are disposed in the horizontal picture format; the centrally directed camera and their corresponding monitors are disposed in the vertical picture format. Mirrors located between the monitor surfaces and the magnifying lens directs the pictures on the monitors into the lens.

14 Claims, 2 Drawing Sheets

4,757,378

MONOCULAR SCENE GENERATOR FOR BIOCULAR WIDE FIELD OF VIEW DISPLAY SYSTEM

BACKGROUND OF THIS INVENTION

1. Field of the Invention

This invention relates to vision display systems particularly those for use by an aircraft pilot to view the surrounding terrain from a more favorable vantage point than the cockpit.

More particularly, the invention pertains to a vision display system that presents to the pilot or operator both a biocular view of the scene and a binocular view of the scene from a display mounted on a helmet.

2. Description of the Prior Art

When a scene is viewed from a single position and is presented to the observer at both eye positions the view lacks the perception of depth, the third dimensional effect. A scene viewed in this way is called biocular. However, when a single scene is viewed from two positions spaced even slightly from one another the view presented to the observer has the sense of depth. A scene viewed in this way is called binocular. A scene viewed from one eye position and produced from one position is called monocular and lacks the third dimensional effect. Biocular and monocular display systems necessarily produce relatively narrow fields of view.

However a pilot requires a wide field of view, particularly when looking leftward or rightward from center, whereas when looking forward a relatively narrow field of view horizontally is acceptable.

Monocular scene generators can be used to produce a biocular system but the result is restricted to a narrow field of view, and one lacking the requisite third dimension effect.

When a helicopter accelerates during flight from hover to high forward speed, the attitude of the fuselages pitches nose down as much as 40 degrees. Therefore, a visual display system for use by a helicopter pilot should have a wide vertical field of view when looking forward so that the surrounding terrain can be seen both in the hover attitude and the high forward speed attitude.

Furthermore, the pilot should have a wide horizontal field of view when the aircraft is in both the nosedown and hover attitudes. Preferably the pilot's view from the display will permit adequate differentiation between objects at various distances from the camera that is used to produce the picture seen by the pilot.

SUMMARY OF THE INVENTION

It is an object of this invention to provide a binocular display system having a wide field of view using a monocular scene generator.

It is another object of this invention to provide a wide vertical field of view using a monocular scene generator.

It is a further object of this invention to provide a wide field of view display mounted on the helmet of a pilot so that the monitors and lens carried on the helmet apply the least possible amount of moment to the helmet tending to rotate the helmet downward relative to the pilot's eyes.

The display system of this invention accomplishes these objects simply and at low cost by using a monocular scene generator from which excellent depth perception is realized. The system includes three television cameras or other view sensors such as infra-red, light amplification, millimeter wave and $CO_2$ laser radar sensors from which an image can be produced on small monitors having a screen whose size is approximately 1.0 inch × 1.5 inches.

One camera is directed forward, parallel to the longitudinal axis of the aircraft and two laterally directed cameras, turned angularly with respect to the axis from opposite sides of the axis, are directed at the same scene as the forward-looking camera. Each laterally-directed camera produces a picture on a monitor, which is disposed in a horizontal picture format. The forward-looking camera and the monitors on which the picture is produced by that camera is displayed in the vertical picture format.

Lenses carried on an eyepiece are used to magnify and focus the picture of the scenes on the monitors. In a compact embodiment of this display system mirrors located in the eyepiece direct the pictures on the screens of the monitors from a horizontal plane into a vertical plane so they can be seen by the pilot looking forward and laterally while seated in the cockpit.

DETAILED DESCRIPTION OF THE INVENTION

Figure 1:
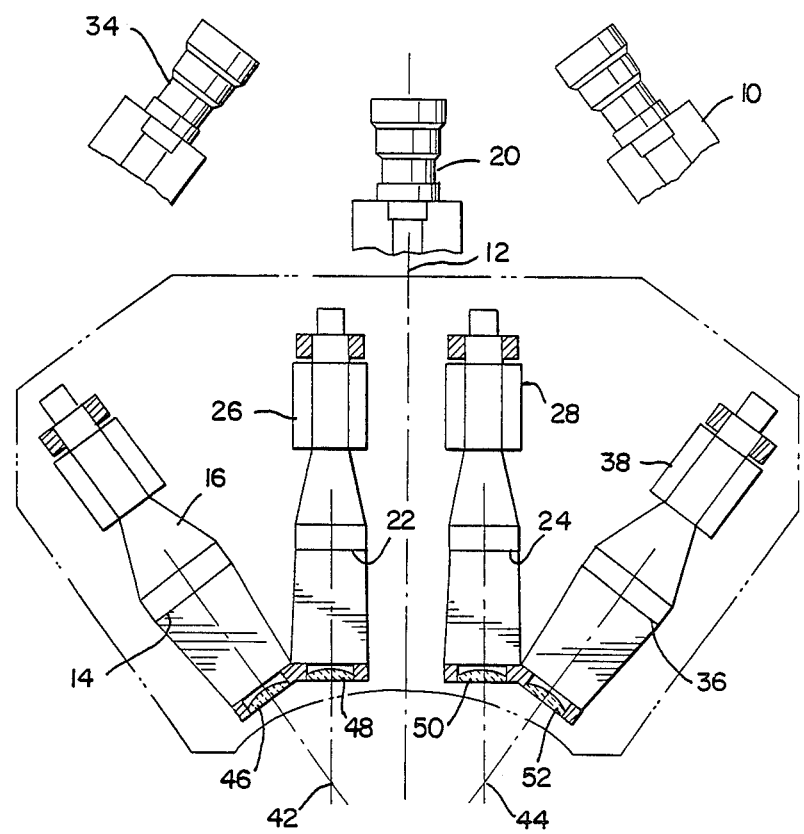
FIG. 1 is a top view of a binocular wide field of view display system according to an embodiment of the present invention in which the lens and surfaces of the television monitors define a plane in which the viewing eye is located.
Figure 2:
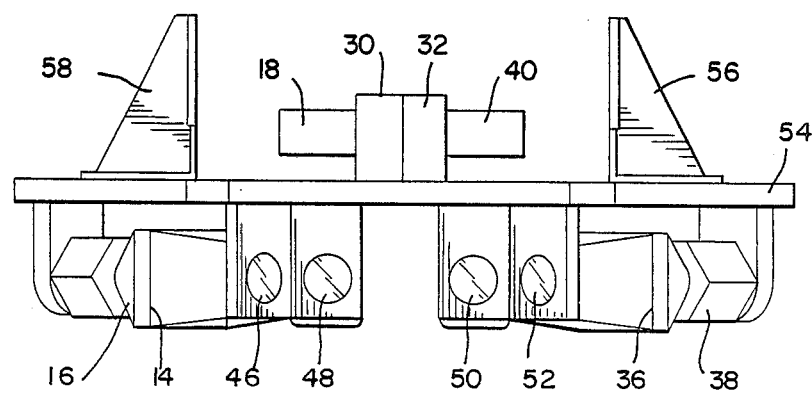
FIG. 2 is front view of the display system of FIG. 1 illustrated from the perspective of the display system viewing subject.

Referring first to FIGS. 1 and 2, a first television camera 10, directed at the scene to be viewed by the operator on the visual display apparatus of this invention, is turned about 40° relative to the central axis 12. The picture produced by camera 10 is displayed on the surface 14 of a first monitor 16. Both camera 10 and monitor 16 are disposed in the horizontal picture mode, i.e., such that the horizontal sides have the larger dimension of the picture. Picture 18 of FIG. 2 represents the image produced in the display apparatus as viewed by the operator and produced by camera 10.

A second television camera 20 directed at the same scene is aligned parallel to axis 12. The picture produced by camera 20 is displayed on the surfaces 22 and 24 of second and fourth monitors 26, 28. Camera 20 and monitors 26 and 28 are disposed in the vertical picture mode, i.e., such that the vertical sides of the pictures have the larger dimension and the horizontal sides have the smaller dimension of the picture. Pictures 30 and 32 of FIG. 2 represent the images produced in the display apparatus as viewed by the operator and produced by camera 20. Pictures 30 and 32 are in the vertical picture mode and result by rotating the television camera 20 and monitors 26 and 28, 90° about an axis through their longitudinal centers so that the picture stands vertically instead of horizontally.

A third television camera 34, directed at the same scene is turned angularly relative to axis 12 about 40° in the direction that is opposite to the direction that camera 10 is turned relative to axis 12. The picture produced by camera 34 is displayed on the surface 36 of a third monitor 38. Both camera 34 and monitor 38 are disposed in the horizontal picture mode. Picture 40 of FIG. 2 represents the image produced in the display apparatus as viewed by the operator and produced by camera 34.

The television cameras may be visible light or infrared cameras located on the nose of an aircraft, or they may be visible light cameras moving over a terrain board in a flight simulator.

The eyes of the operator or pilot, located at points 42, 44 have located immediately before them magnifying lenses 46, 48, 50, 52, preferably plano-convex lenses having the planar surface facing the operator. The surfaces 14, 22, 24, 36 of the monitors are best located beyond the focal length of the lens at a distance that causes the scene to appear about twenty feet from the operator. The lenses should be adjustable relative to their distance from the monitor surfaces to permit correct focusing to correct for and accommodate differences that arise from near-sightedness, farsightedness and interpupillary distance.

The angular disposition of cameras 10, 34 and of monitors 16, 38 is established so that the adjacent edges of pictures 18, 30, 32, 40 are substantially aligned. The distance between the monitors is established in conjunction with the angular dispositions so that the edges of the pictures are aligned and touching.

When the operator looks forward through lenses 48, 50 the scene is presented in pictures 30, 32 so that the vertical field of view is greater than the horizontal. This view accommodates the nosedown attitude of the helicopter as it flies at high speed and permits a large vertical field of view. When the operator looks through lens 46 the left eye views picture 18, which presents a large horizontal field of view and the right eye sees nothing. Similarly, when the operator looks through lens 52, picture 40 is seen by the right eye, and the left eye sees nothing.

The monitors are mounted on a plate 54 which is mounted by brackets 56, 58 to a helmet 60 worn by the pilot or operator.

Figure 3:
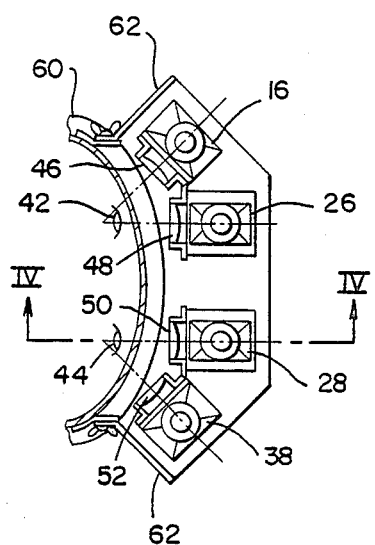
FIG. 3 is a top view of a binocular wide field of view display system according to another embodiment of the present invention in which the surfaces of the television monitors are located in planes other than the plane defined by the lens and the viewing eye.
Figure 4:
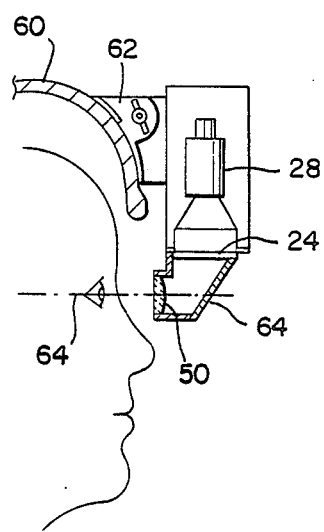
FIG. 4 is a side view taken at plane IV—IV of the display system of FIG. 2 showing the viewing subject using the system.

The visual display can be arranged as shown in FIGS. 3 and 4 so that the monitors 16, 26, 28, 38 are mounted vertically by a bracket 62 to helmet 60. In this arrangement the picture produced by camera 10 is displayed on the surface 14 of monitor 16, the picture of camera 20 is displayed on the surfaces 22, 24 of monitors 26, 28, respectively, and the picture produced by camera 34 is displayed on screen 36 of monitor 38. Cameras 10 and 34 and monitors 16, 38 are disposed in the horizontal picture mode, and camera 26 and monitors 26, 28 are disposed in the vertical picture mode.

In the embodiment of FIGS. 3 and 4, a mirror 64 is located between each lens and the screen of the respective monitors so that the picture on each screen is reflected horizontally toward the lens and the eyes of the operator define a plane that is substantially horizontal, and the axis of the monitors are perpendicular to plane 64.

Normally the picture produced by a television camera is displayed on the screen of its associated monitor by forming the image at very high frequency by scanning a screen from left to right and from top to bottom, as the page of a book is read, until the screen is filled with the entire picture. However, in this arrangement, monitors 26 and 28 in addition to being rotated 90° about an axis passing through the screen into the vertical picture mode are also rotated 180° about an axis that is perpendicular to the axis through the screen so that the picture is inverted. The picture on monitors 16 and 28 are also inverted because of the presence of the mirror. Therefore the scanning done as the picture is displayed on the screens of the monitors must proceed from right-to-left. This adjustment is made by a simple change of polarity at the input par of the monitor.

What is claimed is:

1. A visual display apparatus for generating a wide field of view with respect to a central axis of a scene viewed by an operator comprising:
    a first television camera disposed in the horizontal picture format, directed at the scene and turned angularly relative to the central axis;
    a second television camera disposed in the vertical picture format, directed at the scene and aligned parallel to the central axis;
    a first monitor disposed in the horizontal picture format having a surface on which the picture produced by the first television camera is displayed;
    a second monitor disposed in the vertical picture format, having a surface on which the picture produced by the second television camera is displayed; and
    magnifying lens means located between one eye of the operator and the surfaces of the first and second monitors for magnifying and focusing the pictures displayed on the monitors for viewing by the operator.

2. The display apparatus of claim 1, wherein the first television camera is turned relative to the central axis at the angle that causes the edge of the picture on the surfaces of the first monitor that is closest to the central axis to align substantially with the adjacent edge of the picture on the surface of the second monitor, as these pictures are viewed by the operator.

3. The display apparatus of claim 1, wherein the first television camera is turned substantially at 40° relative to the central axis.

4. The display apparatus of claim 1, wherein the surfaces of the monitors are located beyond the focal length of the magnifying lens means.

5. The display apparatus of claim 1, wherein the magnifying lens means is plano-convex and the surfaces of the monitors are located beyond the focal length of the magnifying lens means.

6. The display apparatus of claim 1, further comprising:
    a third television camera disposed in the horizontal picture format, directed at the scene and turned angularly relative to the central axis in the direction that is opposite to the direction that the first television camera is turned relative to the central axis;
    a third monitor disposed in the horizontal picture format, having a surface on which the picture produced by the third television camera is displayed; and
    a fourth monitor disposed in the vertical picture format, having a surface on which the picture produced by the second television camera is displayed; wherein the magnifying lens means includes:

first and second lenses each located between the eye of the operator that corresponds to the direction that the first television camera is turned relative to the central axis and the first and second monitor surfaces; and third and fourth lenses each located between the other eye of the operator and the surfaces of the third and fourth monitors, for magnifying and focusing the picture displayed on the monitors for viewing by the operator.

7. The display apparatus of claim 6, wherein the third television camera is turned relative to the central axis at the angle that causes the edge of the picture on the surface of the third monitor that is closest to the central axis to align substantially with the adjacent edge of the picture on the surface of the fourth monitor, as these pictures are viewed by the operator.

8. The display apparatus of claim 6, wherein the third television camera is turned substantially at 40° relative to the central axis.

9. The display apparatus of claim 6, wherein the magnifying lens means is plano-convex and the surfaces of the monitors are located beyond the focal length of the magnifying lens means.

10. The display apparatus of claim 6, wherein the surfaces of the monitors are located beyond the focal length of the magnifying lens means.

11. The display apparatus of claim 1, further including:

a helmet worn by the operator; and means for mounting the display apparatus on the helmet so that the magnifying lens means is located in front of the eyes of the operator.

12. The display apparatus of claim 6, further comprising:

a helmet worn by the operator; and means for mounting the display apparatus on the helmet so that the magnifying lens means and surfaces of the monitors are located in front of the eyes of the operator.

13. A visual display apparatus for generating a wide field of view with respect to a central axis of a scene viewed by the operator comprising:

magnifying lens means located in front of the eyes of the operator defining a first plane in which the eyes of the operator are located;

a first television camera disposed in the vertical picture format, directed at the scene, and aligned substantially parallel to the central axis;

a first monitor, disposed in the vertical picture format, having a surface on which the picture produced by the first television camera is displayed, the surface being substantially perpendicular to the first plane;

second and third television cameras disposed in the horizontal picture format, directed at the scene, the second camera turned angularly relative to the central axis in a first direction, the third camera turned angularly relative to the central axis in a second direction that is opposite to the direction that the second camera is turned relative to the central axis;

second and third monitors, disposed in the horizontal picture format, each having a surface on which the picture produced by the second and third television cameras, respectively, is displayed, the surfaces being substantially perpendicular to the first plane; and mirrors for reflecting the pictures on the monitor surfaces onto the magnifying lens means, wherein the magnifying lens means magnifies and focuses the pictures displayed on the monitors for viewing by the operator.

14. The display apparatus of claim 13, further includes:

a helmet worn by the operator; and means for mounting the display apparatus on the helmet so that the magnifying lens means is located in front of the eyes of the operator.

* * * * *